UNITED STATES PATENT OFFICE.

HARRY P. BASSETT, OF CYNTHIANA, KENTUCKY.

BASIC REFRACTORY COMPOSITION AND PROCESS OF MAKING THE SAME.

1,360,355. Specification of Letters Patent. Patented Nov. 30, 1920.

No Drawing. Application filed October 15, 1919. Serial No. 330,903.

*To all whom it may concern:*

Be it known that I, HARRY P. BASSETT, a citizen of the United States, residing at Cynthiana, in the county of Harrison and State of Kentucky, have invented certain new and useful Improvements in Basic Refractory Composition and Process of Making the Same, of which the following is a specification This invention relates to a basic refractory composition adapted for use as a lining for furnaces or the like, and has particular reference to a composition of this character produced from magnesian limestone.

I have discovered that a basic refractory composition suitable for lining open hearth furnaces, Bessemer converters, and the like, can be readily and economically produced from magnesian limestone, which is substantially free from iron and silica or other compounds of silicon, by adding to such limestone, iron either in a metallic state, as iron scale, or in the form of a compound, as iron oxid, $Fe_2O_3$, silica, or other silicon compound and sodium chlorid or other alkali metal compound.

In the practice of my process, I have obtained the best results by mixing the materials referred to in substantially the following proportions by weight: 100 parts of magnesian limestone; 1 to 2 per cent. of iron scale or a corresponding amount of iron oxid; 4 to 6 per cent. of silica or a corresponding amount of some other compound of silicon and approximately from 2 to 10 per cent., preferably about 2 per cent., of common salt, or an equivalent amount of some other alkali metal compound.

The mixture is heated to a temperature of approximately 1800° F., or above, the temperature employed being determined by the temperature to be maintained in the furnace to be lined with the product produced in accordance with my process. I ordinarily employ a temperature of from 2000 to 2500° F.

The resulting product comes out of the kiln in the form of granules, ordinarily from about $\frac{1}{2}$ to 1 inch in diameter, a small portion of the product being in the form of a coarse powder.

Magnesian limestone containing iron and silica in substantially the proportions indicated and heated to a high temperature, ordinarily from 2600 to 3000° F., is a commercial product known as "double burned" dolomite. My improvement consists in the use in a composition of this character of a small proportion of sodium chlorid or other alkali metal compound which results in the production of a basic refractory material which will not slake with water, at a materially lower temperature than that to which it is necessary to heat prior compositions intended for the same purpose.

Instead of using iron either in a metallic state or in the form of a compound, in the composition referred to, it is possible to use any metal of the iron or aluminum groups, notably aluminum, titanium, chromium, zirconium or tungsten or any compound of a metal belonging to either of such groups, and it is to be understood that such metals are to be regarded as equivalents of iron for use in my process and composition.

Certain deposits of magnesian limestone contain iron and silica or other silicon compound in approximately the proportions indicated above. In the treatment of such dolomite, it is to be understood that the addition of iron and silica or other compound or silicon is unnecessary. If the dolomite contains some iron and silica or other silicon compound, but in smaller proportions than those indicated above, it will be understood that correspondingly smaller proportions of these materials will be added so that the product may have a content of iron and silica or other silicon compound which is substantially or approximately that above indicated.

In the use of my improved product, sufficient water is added to make a soft plastic composition adapted to be readily applied by a shovel or trowel to the interior of the furnace or the like to which it is to be applied.

An important use of my composition is in repairing furnace linings of magnesite or similar refractory bricks.

While I have described in detail the preferred proportions of materials and the preferred details of procedure, it is to be understood that these may be varied and that known equivalents of the materials used may be employed, all without departure from the spirit of the invention or the scope of the subjoined claims.

Having thus described my invention, I claim:

1. The herein described process which consists in adding an alkali metal compound to magnesian limestone, iron and a compound of silicon, and heating the mixture to a temperature of at least approximately 1800° F.

2. The herein described process which consists in adding approximately from 2 to 10 per cent. of an alkali metal compound to a mixture of magnesian limestone, iron and a compound of silicon, and heating the mixture to a temperature of at least approximately 1800° F.

3. The herein described process which consists in adding approximately from 2 to 10 per cent. of sodium chlorid to a mixture comprising approximately 100 parts by weight of magnesian limestone, 1 to 2 parts by weight of iron, and 4 to 6 parts by weight of a compound of silicon, and heating the mixture to a temperature of at least approximately 1800° F.

4. The herein described composition comprising a mixture of magnesian limestone, iron, a compound of silicon, and sodium chlorid.

5. The herein described composition comprising approximately 100 parts by weight of magnesium limestone, 1 to 2 parts by weight of iron, 4 to 6 parts by weight of a compound of silicon, and from 2 to 10 parts by weight of an alkali metal compound.

In testimony whereof I affix my signature in presence of two witnesses.

HARRY P. BASSETT.

Witnesses:
MARY F. LYONS,
CURTIS C. MEIGS.